United States Patent [19]

Dixon

[11] Patent Number: 4,677,709
[45] Date of Patent: Jul. 7, 1987

[54] POULTRY DELUNGER APPARATUS

[76] Inventor: Fred W. Dixon, R.F.D. 5, Bluff City, Tenn. 37618

[21] Appl. No.: 821,896

[22] Filed: Jan. 23, 1986

[51] Int. Cl.$^4$ ............................................. A22C 21/06
[52] U.S. Cl. ...................................................... 17/11
[58] Field of Search ............................................ 17/11

[56] References Cited

U.S. PATENT DOCUMENTS

| | | | |
|---|---|---|---|
| 3,802,028 | 4/1974 | Scheier et al. | 17/11 X |
| 3,908,229 | 9/1975 | Harben, Jr. et al. | 17/11 |
| 4,024,603 | 5/1977 | Harben, Jr. et al. | 17/11 |
| 4,262,387 | 4/1981 | Scheier et al. | 17/11 X |
| 4,467,498 | 8/1984 | Graham et al. | 17/11 X |

Primary Examiner—Willie G. Abercrombie

[57] ABSTRACT

Poultry delunging apparatus comprising a support, a manifold stationarily affixed to the support, a vacuum source adapted for connection to the manifold, a delunging unit rotatably mounted on either or both of the manifold or the support and having a surface lying adjacent the manifold for sliding contact therewith, a plurality of vacuum probes on the periphery of the unit is prearranged spacing therearound and extending generally radially outwardly therefrom, cooperating conduit means in said unit and said manifold means, valve means in said conduit means for rapidly opening or closing the same to apply or interrupt the vacuum to the probes in a predetermined manner, and a drive mechanism for rotating the unit at a speed which coodinates with the speed of the conveyor which transports the poultry to the unit.

10 Claims, 8 Drawing Figures

POULTRY DELUNGER APPARATUS

This invention concerns apparatus for delunging poultry, particularly chickens, and features a rapid action, vacuum mechanism for removing the lungs and which can accommodate a large number of chickens moving to the delunger apparatus in continuous fashion.

Heretofore, the delunging of chickens has involved an enormous amount of labor since the delunging required a worker to actually reach into the cavity of the degutted chicken through the posterior opening and grab the lungs to tear them away from supporting tissues. This operation is necessarily time consuming, labor intensive, and also wasteful of marketable meat in that in the haste of individual production, excessive and unnecessary removal of saleable meat occurs.

Objects therefore of the present invention are: to provide a modern, high speed delunging apparatus which can operate effectively at conveyor transporting speeds; to provide such apparatus which is easy to use and which is readily adaptable to a variety of ancillary equipment such as overhead, chain conveyors and their height adjustments; and to provide such apparatus which can accurately delung poultry without removing excess or unnecessary meat.

These and other objects hereinafter appearing have been attained in accordance with the present invention through the apparatus comprising support means, manifold means stationarily affixed to said support means, a vacuum source adapted for connection to said manifold means, a delunging unit rotatable mounted on either or both of said manifold means or said support means and having a surface lying adjacent said manifold means for sliding contact therewith, a plurality of vacuum probes on the periphery of said unit in prearranged spacing therearound and extending generally radially outwardly therefrom, cooperating conduit means in said unit and said manifold means, valve means in said conduit means for rapidly opening or closing the same to apply or interrupt the vacuum to said probes in a predetermined manner, and drive means for rotating said unit at a prescribed speed.

The invention will be further understood from the following description and accompanying drawings wherein:

FIG. 8 is a cross-sectional view taken along line 8—8 of FIG. 2.

Figure 1:
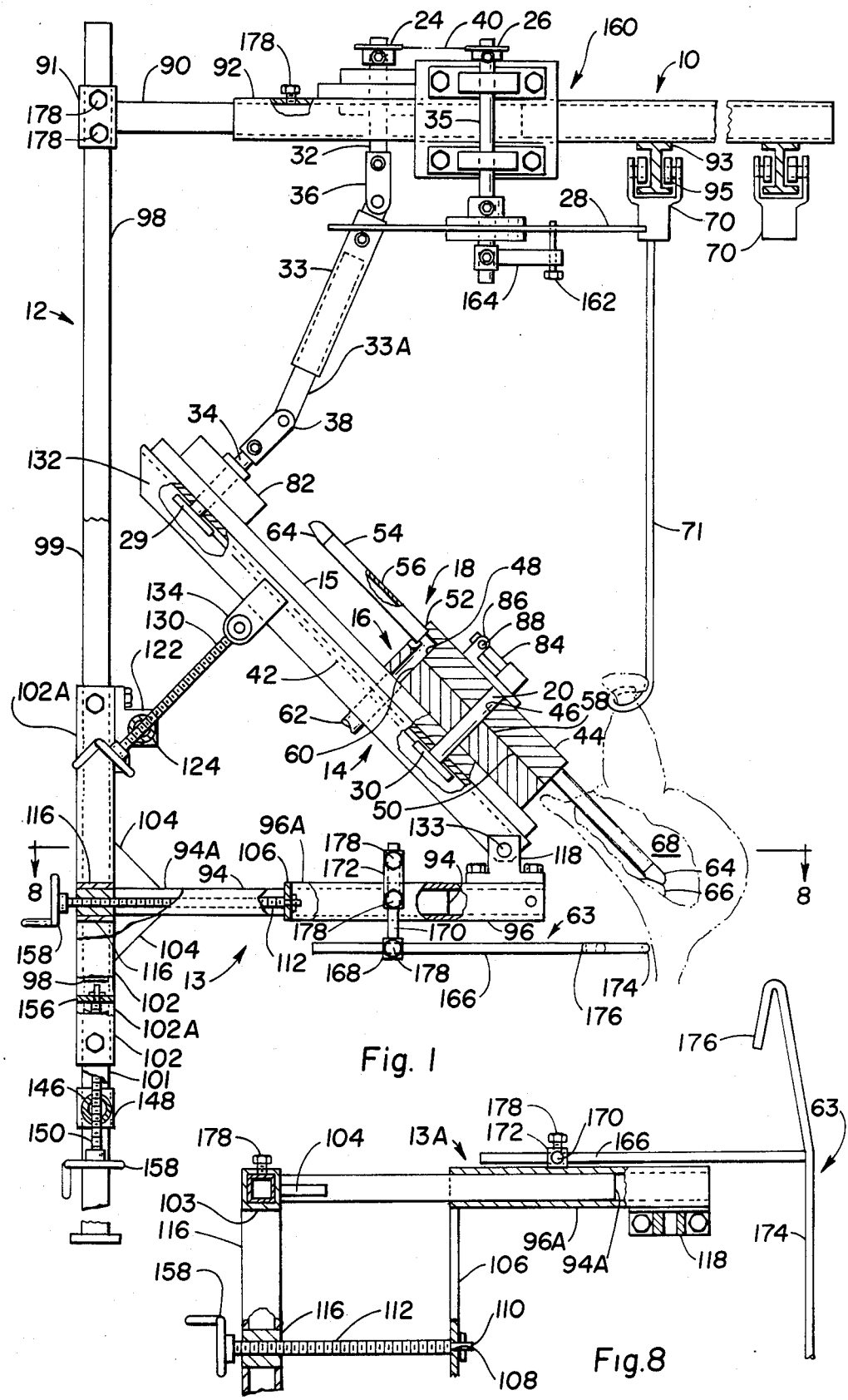
FIG. 1 is a side view partially in section, of the delunging apparatus showing the support means, drive means, manifold means, delunging unit and also a portion of the poultry conveyor with the poultry (in outline) suspended therefrom.

Referring to the drawings, the support means is shown as comprising spaced overhead beams 10 and 10A, spaced uprights 12 and 12A, spaced lower beams 13 and 13A and base 14 mounted thereon and having an upper mounting plate 15. The manifold 16 is stationarily affixed to plate 15 by any suitable means and the delunging unit 18 is rotatably mounted on manifold 16 by axle 20 affixed to said unit. The drive means for axle 20 and unit 18 comprises a power supply and drive chain sprocket (not shown) for a continuous poultry conveyor chain 70 hereinafter described, driven chain sprockets 24, 26, 28, 29 and 30, shafts 32, 33, 33A, 34 and 35, universal joints 36 and 38 and drive chains 40 and 42. Shafts 33 and 33A are splined to allow for relative axial motion.

The delunging unit 18 comprises a generally disc shaped body 44 having a central bore 46 and a plurality of conduits or passages 48 formed in the body and extending from its under or bearing surface 50 to its periphery 52. A plurality (typically fourteen) of vacuum probes 54 are mounted on periphery 52, for example, by friction fitting in suitable countersunk holes in the periphery, and each bore 56 thereof is in communication with one of said passages 48.

The manifold 16 having a disc configuration is secured to plate 15 by any suitable means and is provided with an upper or bearing surface 58 on which surface 50 of the delunging unit is adapted to slide during rotation of the unit. A vacuum conduit or passage 60 (which may be dual or hereinafter shown for dual probes) is provided in manifold 16 and extending through plate 15 and is adapted to connect vacuum line 62 in turn to each conduit 48 and its associated probe as unit 18 is rotated.

Figure 7:
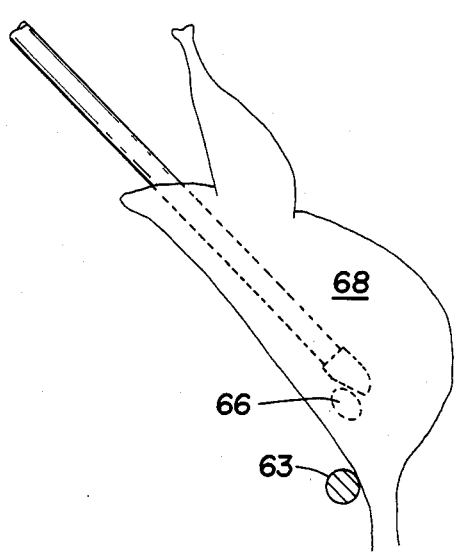
FIG. 7 is a side view of the chicken with probe inserted of FIG. 6.
Figure 6:
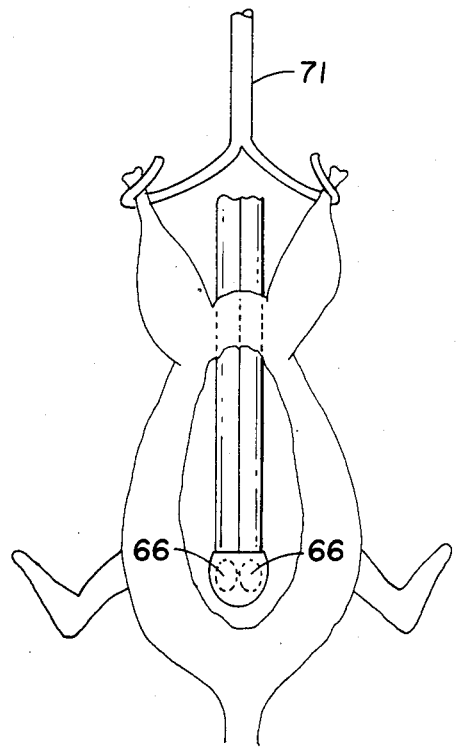
FIG. 6 is a partial sectional front view of a chicken showing the working position of the probe head overlying the lungs.

Vacuum probes 54 are either formed at their ends or provided with attachable elements to provide suction heads 64 which can be positioned adjacent the lung by insertion of the probe into the degutted cavity. With reference to FIGS. 1, 6 and 7, the approximate position and proportionate size of typical chicken lungs 66 are shown. These lungs lie at a posterior portion of cavity 68 and present more of a problem for hand removal than do the other organs.

In operation of the present apparatus, conveyor 70 carrying the chickens suspended from their spread drumsticks by any suitable means such as clips 71 of any convenient configuration moves in a continuous manner into and through the probe path. The chickens are spaced along conveyor 70, typically about every six inches, to match the spacing between the suction heads of the probes, and the rotational speed (typically about 5.5 revolutions/minute) of unit 18 is adjustable to present a probe to each chicken as it moves into said probe path. The vacuum valve means provided by the essentially hermetic sliding seal of surfaces 50 and 58 connects each conduit 48 to vacuum conduit 60 and line 62 for the period of time necessary to insure that both lungs are sucked from the chicken and through the apparatus for removal from the vacuum system downstream of the delunging unit and manifold. Various guide means such as rail 63 may be provided to position the chicken with the lungs against the suction head 64 for insuring proper suction.

Figure 5:
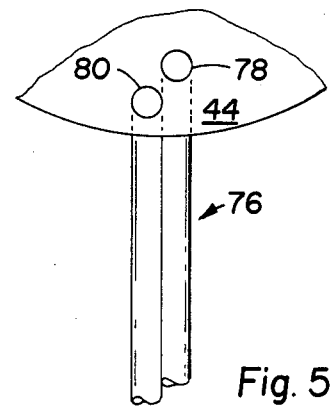
FIG. 5 shows the mounting arrangement of dual suction barrels in delunging unit.
Figure 4:
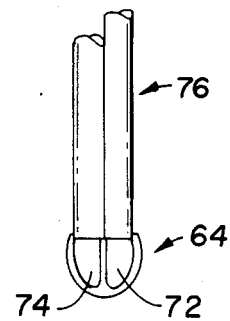
FIG. 4 is an open or front view of a dual suction head.

The suction heads may be divided as shown in FIG. 4 to provide two ports 72 and 74, one for each lung, both of which are adapted to communicate with conduit 48. This type of head is shown in FIGS. 4 and 5 affixed to a double barrel probe 76, one barrel for each lung. Referring to FIG. 5, in order to compliment such probes, conduit 48 may comprise two adjacent, substantially side by side passages 78 and 80 in body 44 such that vacuum is applied simultaneously to both head ports 72 and 74 for simultaneous removal of both lungs.

FIG. 5 shows passages 78 and 80 as radially offset in order that the sliding valve provided by bearing surfaces 50 and 58 can function to simultaneously apply the vacuum to each barrel of the probe for essentially the same duration.

In the present apparatus, various position adjusting means may be provided to insure that the vacuum is effective to remove the lungs. For example, in order to adjust the rotational speed of unit 18 to precisely coincide to the speed and spacing of the poultry arriving at said unit, a variable speed gear box 82 may be provided in known manner to regulate the rotational speed. Also, a unique fine tune adjustment is provided by means of arm 84 affixed by any suitable means to axle 20 (which in this embodiment is not fixed to body 44 but is rotatably mounted therein) and cooperating brackets 86 secured in any suitable manner to body 44 having adjusting screws 88 therein. These screws contact arm 84 and in cooperation with each other can shift the position of the probes relative to the chickens by rotation of body 44 relative to axle 20.

The manifold 16 and delunging unit 18 are preferably of Teflon to provide inherent lubricity for sliding bearing surfaces 50 and 58 as well as for non-corrosiveness and ease of manufacture. The vacuum source is provided by known, commercially available means and is regulatable to provide vacuum down to about 1 Torr or less. The vacuum used will depend on the suction head size, the probe inside diameter and the like. In most cases from about 600 to about 200 inches of mercury, absolute, will suffice.

Figure 2:
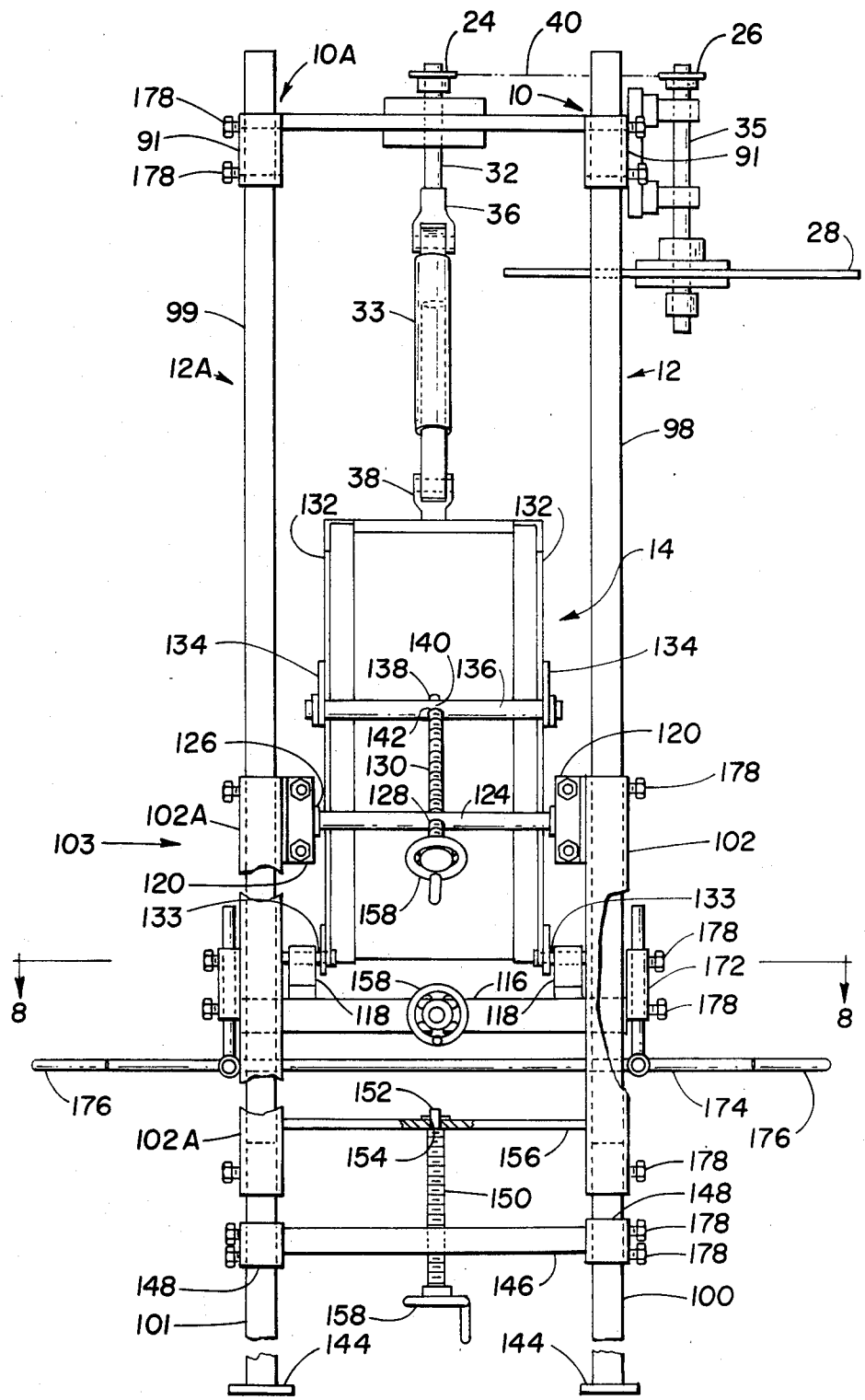
FIG. 2 is a rear view of the apparatus of FIG. 1.
Figure 3:
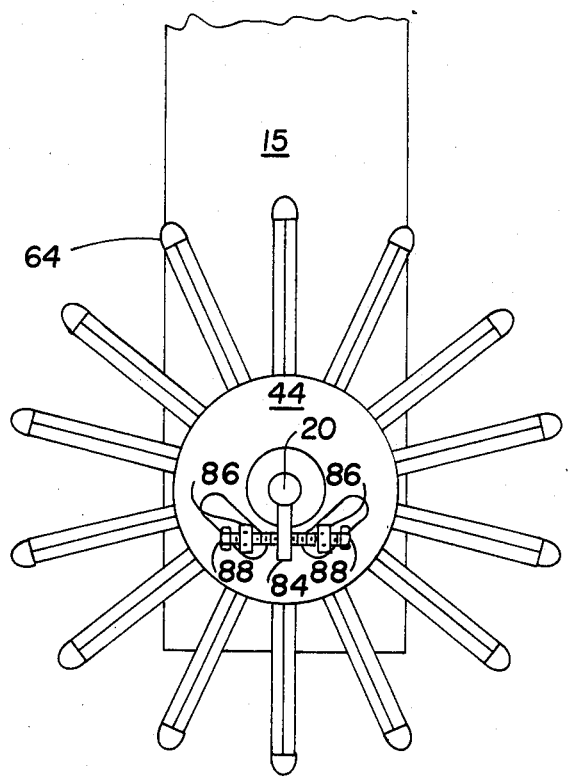
FIG. 3 is a front view, partially in section, of the delunging unit of FIG. 1 with dual probe barrels.

Referring to FIGS. 1 and 2, the preferred structure of the present apparatus is shown and includes a number of adjustment features which impart greater utility to the invention in accommodating large variations in poultry size, conveyor speeds and other such changeable operating parameters typical of poultry processing operations.

In this preferred embodiment the beams and uprights are of square tubular steel with each beam 10 and 10A being comprised of a section 90 slidable with fairly close tolerances within a section 92, and beams 13 and 13A being comprised of sections 94 and 94A similarly slidable within sections 96 and 96A respectively. Uprights 12 and 12A are comprised of top and bottom sections 98 and 99 and 100 and 101 respectively slidable within opposite ends of sections 102 and 102A respectively of center carriage 103.

An important aspect of this embodiment is the magnitude and type of spatial adjustment that can be made very rapidly and easily of the delunging unit relative to the poultry to insure proper placement of the probe in the body cavity for extraction of the lungs. This adjustment is provided primarily by means of center section or carriage 103 which supports base 14, plate 15, manifold 16, unit 18 and its drive mechanism for pivotal adjustment transversely to the plane of travel of the poultry as well as for vertical adjustment in said plane of travel.

Referring to FIGS. 1 and 2, each lower beam section 94 and 94A is welded to a center section 103, preferably employing gussets 104 in known manner. Sections 96 and 96A slidable on their associated sections 94 and 94A are welded to the ends of tie-beam 106 for movement in unison with movement of 106. This tie-beam as shown in FIG. 8 is provided with an aperture 108 in which the end 110 of a screw 112 is rotatably mounted and secured in position by pin 114. Screw 112 is threadely mounted in nut member 116 which member is welded to center sections 102 and 102A and further serves to space and rigidify these sections. The outer end of each section 96 and 96A is provided with a bearing block 118 secured thereto by any suitable means such as welding. The upper ends of sections 102 and 102A are welded to angle iron members 120 to which bearing blocks 122 are affixed. A shaft 124 is rotably mounted in blocks 122 and positioned therein by any suitable means such as collars 126. This shaft is provided with a threaded aperture 128 in which screw 130 is mounted. Referring to previous description, base 14 comprises angle iron rails 132 on the top of which the mounting plate 15 is affixed by any suitable means. Shafts 133 affixed to rails 132 and rotatably mounted in blocks 118 provide pivotal adjustment for the delunging unit. Attached to the sides of said rails are bearing brackets 134 in which shaft 136 is rotatably mounted. The end 138 of screw 130 is rotatably mounted in aperture 140 in shaft 136 with shoulder 142 of the screw bearing on the shaft for exerting force thereagainst.

Bottom sections 100 and 101 which are slidably mounted in center sections 102 and 102A are preferably provided with bolt flanges or feet 144 for permanent attachment to a floor and are spaced by means or rod 146 having tubular bearing members 148 welded thereto and vertically slidably mounted on sections 100 and 101. Threadedly mounted in rod 146 is screw 150 having a reduced end 152 rotatably mounted in aperture 154 in bar 156 welded to sections 102 and 102A. All of the screws herein are conveniently provided with handwheels 158.

One of the upper sections 92 conveniently carries the pillow block bearing assembly 160, preferably with means to lock the inner rod to the shaft 35 which is affixed to sprocket 28 in turn driven by continuous chain 70 of the poultry conveyor which is driven by a main conveyor drive. Sprocket 26 affixed to shaft 35 drives sprocket 24 through chain 40 and hence the delunging unit. A quick release pin 162 slidably mounted through an aperture in arm 164 affixed to shaft 35 and projecting through an aperture in sprocket 28 is the drive mechanism for shaft 35 since sprocket 28 is not affixed to shaft 35. When it is necessary to stop rotation of the delunging unit pin 62 is simply pulled downwardly out of engagement with sprocket 28 to allow the same to idle in response to movement of chain 70.

The poultry guide 63 comprises a pair of support rods 166 slidably mounted in bearings or guides 168 formed on the end of uprights 170 which themselves are slidably mounted in bracket bearings or guides 172 affixed to sections 102 and 102A. Rods 166 are affixed to the actual guide rod 174 which is substantially straight and parallel to the direction of poultry feed but having rearwardly curved ends 176. Set screws 178 in bearings 168 and 172 maintain the adjusted position of rod 174.

In operation of the present apparatus, beam sections 90 having sleeves 91 slidably mounted on sections 98 and 99 are adjusted vertically to position sections 92 over the top of beam 93 which supports the trolley rollers 95 of the chain conveyor 70, and set screws 178 are tightened. According to the size of the poultry carried by the conveyor to the delunging unit the position of the probes relative to the poultry is adjusted by any or all of the adjusting screws 112, 130 or 150. Screw 150 vertically adjusts the entire delunging unit without altering the probe angle, while screws 112 and 130 can move the unit horizontally or angularly, or both, with respect to the bird. The cooperating keyed or splined sliding shafts 33 and 33A readily accommodate distance changes between the universal joints 36 and 38 during the adjustment. As adjustments are made, the various elements are locked in position by set screws 178 or other suitable means.

The invention has been described in detail with particular reference to preferred embodiments thereof, but it will be understood that variations and modifications will be effected within the spirit and scope of the invention.

I claim:

1. Poultry delunging apparatus comprising support means, manifold means stationarily affixed to said support means and having an upper bearing surface, a vacuum source adapted for connection to said manifold means, a delunging unit rotatably mounted on either or both of said manifold means or said support means and having a surface lying adjacent said bearing surface of said manifold means for sliding contact therewith, a plurality of vacuum probes on the periphery of said unit in prearranged spacing therearound and extending generally radially outwardly therefrom, cooperating conduit means in said unit and said manifold means, valve means in said conduit means for rapidly opening or closing the same to apply or to interrupt the vacuum to said probes in a predetermined manner, said valve means comprising said bearing surface of said manifold means and said surface of said delunging unit, and drive means for rotating said unit at a prescribed speed.

2. The apparatus of claim 1 wherein each probe comprises a tubular member which is insertable into the lung cavity of degutted poultry through the posterior opening thereof.

3. The apparatus of claim 1 wherein at least about six probes are positioned on said periphery.

4. The apparatus of claim 1 wherein the probes are dual barrel.

5. The apparatus of claim 4 wherein the probe barrel inlets are slanted with respect to the probe barrel axes.

6. The apparatus of claim 1 wherein said support means comprises a portion of a building, and wherein poultry conveyor means is positioned on said support means for conveying degutted poultry to a position relative to said probes, the speed of said conveyor means being coordinated with the rotational speed of said delunging unit to allow automatic insertion of each probe into and the removal from the degutted cavity of poultry in a continuous, timed manner.

7. The apparatus of claim 6 wherein said valve means is adapted for applying vacuum to each probe only when the probe suction head is adjacent to or in contact with the poultry lungs.

8. The apparatus of claim 1 wherein adjusting means is provided on said delunging unit for adjusting the axial position thereof including said vacuum probes relative to poultry arriving at said unit for delunging.

9. The apparatus of claim 1 wherein said valve means comprises cooperating surfaces of said manifold means and said delunging unit.

10. The apparatus of claim 7 wherein said support means comprises a pair of substantially vertical, spaced uprights having a carriage extending therebetween and slidable thereon for vertical adjustment of said carriage, means on said carriage pivotally supporting a lower portion of said base for pivotal motion thereof transverse to the plane of travel of the poultry to the apparatus, means on said carriage pivotally connected to an upper portion of said base for imparting said pivotal motion thereto, and cooperating means on said uprights and said carriage for imparting said vertical adjustment thereto.

* * * * *